United States Patent
Iyo et al.

(10) Patent No.: US 11,028,243 B2
(45) Date of Patent: Jun. 8, 2021

(54) ORIENTED POLYESTER FILM

(71) Applicant: TOYOBO FILM SOLUTIONS LIMITED, Tokyo (JP)

(72) Inventors: Naoki Iyo, Tokyo (JP); Shinji Yano, Tokyo (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 16/799,546

(22) Filed: Feb. 24, 2020

(65) Prior Publication Data
US 2020/0270407 A1    Aug. 27, 2020

(30) Foreign Application Priority Data

Feb. 25, 2019    (JP) .............................. JP2019-031352

(51) Int. Cl.
| | | |
|---|---|---|
| *B32B 27/08* | (2006.01) | |
| *C08J 5/18* | (2006.01) | |
| *B32B 27/20* | (2006.01) | |
| *B32B 27/36* | (2006.01) | |

(52) U.S. Cl.
CPC ................. *C08J 5/18* (2013.01); *B32B 27/08* (2013.01); *B32B 27/20* (2013.01); *B32B 27/36* (2013.01); *C08J 2367/02* (2013.01); *C08J 2491/06* (2013.01)

(58) Field of Classification Search
CPC ......... B32B 27/08; B32B 27/20; B32B 27/36; C08J 2367/02; C08J 2423/30; C08J 2491/06; C08J 5/18
See application file for complete search history.

(56) References Cited

U.S. PATENT DOCUMENTS 4,810,540 A    3/1989    Ellison et al.

FOREIGN PATENT DOCUMENTS

| JP | S63-123469 A | 5/1988 |
|---|---|---|
| JP | H09-183136 A | 7/1997 |

*Primary Examiner* — Lawrence D Ferguson
(74) *Attorney, Agent, or Firm* — Leydig, Voit & Mayer, Ltd.

(57) ABSTRACT

An oriented polyester film containing antioxidant and modified polyolefin wax in a surface layer on at least one side thereof, wherein the oriented polyester film is such that the modified polyolefin wax contained in said layer is present in an amount that, as measured based on weight of a composition at said layer, is not less than 0.1 wt % but less than 3.0 wt %, and wherein the modified polyolefin wax is such that acid value thereof is not less than 1 mg KOH/g but less than 50 mg KOH/g, 3 wt % weight loss onset temperature thereof is not less than 300° C., weight-average molecular weight thereof is within a range that is 3,500 to 65,000, and the antioxidant is present in an amount that, as measured based on the weight of the composition, is not less than 0.02 wt % but less than 0.35 wt %.

19 Claims, No Drawings

ORIENTED POLYESTER FILM

TECHNICAL FIELD

The present invention relates to an oriented polyester film, with excellent adhesiveness with respect to functional layers such as printing layers and hard coat layers and with low coefficient of friction, such as is capable of being favorably employed as a paint replacement film or other such base film.

BACKGROUND ART

Spray painting has ordinarily been employed conventionally to improve design characteristics of such items as exterior parts of cars (e.g., fenders, bumpers, hoods, hubcaps, and other such molded resin parts). However, because painting operations including those in connection with such spray painting require large facilities and space for carrying out painting and drying in repeated fashion, which reduces productivity, methods of improving the external appearance of products by causing decorative films (hereinafter "paint replacement films") to be affixed to the aforementioned exterior parts have in recent years been investigated with the goal of improvement in the efficiency of painting operations or the like.

As shown for example at FIG. 1 of Patent Reference No. 1, paint replacement film 1 produced using a conventional technique of this type is constituted as a result of sequential lamination of transparent film (clear layer) 11, colored layer 12, and adhesion layer 13.

Here, clear layer 11—which is formed using a highly transparent resin material such as, for example, polyurethane, acrylic resin, polyester resin, silicon-type resin (silicone resin), PVDF (polyvinylidene fluoride), or a mixture thereof—has functions such as that of enhancing glossiness of or protecting colored layer 12.

Furthermore, as shown at FIG. 2 of Patent Reference No. 2, the colored layer is formed by blending metallic pigment within a resin material that is more or less similar to that of clear layer 11, as a result of which the colored layer is able to provide the external appearance with a metallic color which is close to that which would be provided by spray painting. Moreover, adhesion layer 5 is for causing paint replacement film 1 to adhere to the surface of an exterior part or the like of an automobile.

In addition, when this paint replacement film 1 is to be made to adhere to the aforementioned exterior part or the like, after causing paint replacement film 1 to be heated in advance as a result of irradiation by an infrared lamp or the like, this paint replacement film 1 is molded in such fashion as to conform to the shape of the surface of the exterior part by means of in-mold forming, vacuum forming, or the like, and is affixed to the surface of the exterior part by means of adhesion layer 5. Here, when paint replacement film 1 is being affixed thereto, it is stretched so as to conform to the outline of the exterior part or a die, and is affixed to the exterior part.

PRIOR ART REFERENCES

Patent References

Patent Reference No. 1: Japanese Patent Application Publication Kokai No. S63[1988]-123469
Patent Reference No. 2: Japanese Patent Application Publication Kokai No. H9[1997]-183136

SUMMARY OF INVENTION

Problem to be Solved by Invention

Due to the demanding molding that is carried out on films including such paint replacement films, there has been a desire to reduce coefficient of friction and so forth. On the other hand, there has been a desire to achieve adhesion with respect to any of various functional layers including hard coat layers and printing layers. Well-known as a method for achieving such a low coefficient of friction is the inclusion therewithin of waxes which are referred to as lubricants. On the other hand, as inclusion of wax therewithin has resulted in impairment of ability to achieve adhesiveness with respect to hard coat layers, printing layers, and other such functional layers, there has been a mutually exclusive relationship between this low coefficient of friction and this adhesiveness. Moreover, there has been the problem that because addition of a wax component to polyester causes the processing temperature at the time that the polyester film is manufactured to increase, there has been occurrence of poor external appearance in accompaniment to degradation of the wax.

For this reason, it is an object of the present invention to provide an oriented polyester film that will permit achievement of excellent adhesive force with respect to various members without producing poor external appearance due to occurrence of defects and/or degradation of resin during formation into polyester film, and that is also provided with a low coefficient of friction permitting achievement of moldability for molding into such items as exterior parts of cars.

Means for Solving Problem

To achieve the foregoing object, the present inventors performed research regarding wax selection, as a result of which it was found that addition of certain wax(es) makes it possible to achieve both adhesiveness and low coefficient of friction without producing poor external appearance due to occurrence of defects and/or degradation of resin during formation into polyester film.

The present invention thus provides the following oriented polyester films 1 through 4, and decorative films employing same.

1. An oriented polyester film containing antioxidant and modified polyolefin wax in a surface layer on at least one side thereof, wherein the oriented polyester film is such that the modified polyolefin wax contained in said layer is present in an amount that, as measured based on weight of a composition at said layer, is not less than 0.1 wt % but less than 3.0 wt %, and wherein the modified polyolefin wax is such that acid value thereof is not less than 1 mg KOH/g but less than 50 mg KOH/g, 3 wt % weight loss onset temperature thereof is not less than 300° C., weight-average molecular weight thereof is within a range that is 3,500 to 65,000, and said antioxidant is present in an amount that, as measured based on the weight of the composition, is not less than 0.02 wt % but less than 0.35 wt %.
2. The oriented polyester film according to 1, above, wherein the modified polyolefin wax contains at least one species selected from among the group consisting of acid-modified polypropylene wax, acid-modified polyethylene wax, polypropylene oxidate wax, and polyethylene oxidate wax.

3. The oriented polyester film according to 1 or 2, above, wherein the modified polyolefin wax is laminarly dispersed within said layer or within the film.

4. A decorative laminated body having the oriented polyester film according to any of 1 through 3, above, and having at least one functional layer selected from among the group consisting of printing layer (colored layer), hard coat layer, adhesion layer, and mold release layer provided on at least one face thereof.

Benefit of Invention

Because oriented polyester films in accordance with the present invention involve selection of certain modified polyolefin wax(es), they make it possible to lower coefficient of friction while also attaining a high degree of adhesiveness with respect to other members, and to do so without producing poor external appearance due to occurrence of defects and/or degradation of resin during formation into polyester film. For this reason, oriented polyester films in accordance with the present invention may be favorably used as decorative films and the like.

EMBODIMENTS FOR CARRYING OUT INVENTION

An oriented polyester film associated with an embodiment of the present invention is a flexible film used in automobile chassis surface panels and the like. Said film is an oriented polyester film in which a surface layer formed from a composition containing modified polyolefin wax and antioxidant is present on at least one of the two sides of said film; wherein the modified polyolefin wax has been made to possess a functional group selected from among the group consisting of carboxyl group, ketone group, and hydroxyl group; wherein said modified polyolefin wax is present therewithin in an amount that is not less than 0.1 wt % but less than 3.0 wt %; wherein the 3 wt % weight loss onset temperature is not less than 300° C.; wherein the weight-average molecular weight thereof is 3,500 to 65,000; and wherein said antioxidant is present therewithin in an amount that is not less than 0.02 wt % but less than 0.35 wt % as measured based on the weight of the composition.

The present embodiment is described in detail below.

The oriented polyester film of the present embodiment mostly comprises polyester. "Mostly comprises" as used herein indicates, as measured based on the weight of the entire film, that polyester is preferably not less than 80 wt % thereof, more preferably not less than 85 wt % thereof, still more preferably not less than 90 wt % thereof, and even still more preferably not less than 95 wt % thereof.

The oriented polyester film in accordance with the present embodiment is such that a layer containing modified polyolefin wax is necessarily present in a surface layer on at least one side thereof, it being possible to the extent that it does not interfere with the object of the present invention for this to be a laminated structure in which there are two or more layers. The oriented polyester film in accordance with the present embodiment may be such that this is a single-layer structure comprising only a layer containing modified polyolefin wax.

Polyester

As the polyester that makes up the oriented polyester film of the present embodiment, polyester homopolymer or polyester copolymer may be used. As polyester homopolymer, polyester that has a melting point which exceeds 250° C. but which is not greater than 260° C. may be favorably cited, it being possible to particularly favorably cite polyethylene terephthalate homopolymer. Note that what is referred to herein as polyethylene terephthalate homopolymer does not exclude that which unavoidably contains a diethylene glycol component. As polyester copolymer, polyester copolymer having a melting point of 210° C. to 250° C. may be favorably cited. Employment of such polyesters will make it possible to withstand the heat generated during molding and/or working, there being a tendency when melting point is below the lower limit for the heat generated during molding and/or working to cause thinning and/or tearing of the film. Furthermore, when melting point exceeds the upper limit, film formation becomes difficult.

Copolymerization component(s) at such polyester copolymer may be acid component(s) and/or alcohol component(s). As acid components, besides acid components which primarily include isophthalic acid, phthalic acid, terephthalic acid, 2,6-naphthalenedicarboxylic acid, and other such aromatic dicarboxylic acids, adipic acid, azelaic acid, sebacic acid, and other such aliphatic dicarboxylic acids and the like may be cited; as alcohol components, ethylene glycol, trimethylene glycol, tetramethylene glycol, and the like may be cited, and diethylene glycol and other such polyoxyalkylene glycols and the like may be cited. Furthermore, 1,6-hexanediol and other such aliphatic diols, and 1,4-hexamethylene dimethanol and other such alicyclic diols and the like, may be cited. Any one of these may be used alone, or any two or more of these may be used. Of these, isophthalic acid and sebacic acid are preferred, isophthalic acid being particularly preferred.

The types and relative amounts of copolymerization component(s) may be adjusted in ordinary fashion so as to produce the aforementioned melting point.

It is preferred that intrinsic viscosity of the polyester be within a range that is not less than 0.4 but not greater than 0.8, more preferred that this be not less than 0.45 but not greater than 0.8, and still more preferred that this be not less than 0.5 but not greater than 0.77. If the intrinsic viscosity is below the lower limit, not only will there be a reduction in film formability and an increase in occurrence of breakages at the film but there will also be increase in the tendency for the film to tear when the film is being molded and/or affixed to a part. While high intrinsic viscosity is preferred from the standpoint of moldability/workability, above the upper limit the stresses which remain following production thereof at the time of molding and/or affixing will cause decrease in adhesiveness over time.

Here, the intrinsic viscosity (IV) of the polyester was determined by substituting, for the equivalent weight of the resin portion at Formula (1), below, the value (IVa) that was obtained by measuring at 35° C. the solution which remained after a centrifugal separator had been used to remove colorant pigment and so forth from that which was obtained after causing the polyester film that had been formed into a film to be dissolved in o-chlorophenol.

$$IV=IVa/(1-C) \quad (1)$$

Here, C indicates the concentration of the colorant pigment at each of the respective layers.

Modified Polyolefin Wax

The oriented polyester film of the present embodiment is such that a surface layer on at least one side thereof contains a modified polyolefin wax that has been made to possess a functional group selected from among the group consisting of carboxyl group, ketone group, and hydroxyl group. By causing the surface layer that contains wax to be provided at the side opposite the face that is affixed to the part, it is possible to reduce friction with respect to the die at the time of molding; and it is furthermore possible following molding for an excellent external appearance to be maintained due to improvement in mold release characteristics with respect to the die. Moreover, causing the wax to be made to possess the aforementioned functional group(s) improves adhesiveness with respect to printing layers, adhesion layers, hard coat layers, and other such functional layers such as may be laminated to polyester film.

As modified polyolefin wax in accordance with the present embodiment, polyolefin wax oxidates having functional group(s) introduced by carrying out oxidation reaction(s) in which air has been introduced to ethylene, propylene, 1-butene, 1-pentene, isobutene, isobutylene, butadiene, and other such polymers of olefin monomers having 2 to 8 carbons or pyrolytic products thereof while in a molten state at 140° to 180° C., acid-modified polyolefin waxes and the like resulting from copolymerization, block polymerization, and/or graft polymerization of monomer(s) containing acrylic acid, methacrylic acid, vinyl acetate, vinyl propionate, maleic acid, maleic anhydride, itaconic acid, maleic acid monomethyl ester, and/or other such unsaturated carboxylic acids having 3 to 8 carbons, and metal salt(s) resulting from neutralization of all or any portion of such acid(s) by sodium, potassium, lithium, zinc, magnesium, calcium, and/or other such monovalent or divalent metal cation(s), methyl acrylate, methyl methacrylate, ethyl acrylate, ethyl methacrylate, n-propyl acrylate, n-propyl methacrylate, isobutyl acrylate, isobutyl methacrylate, n-butyl acrylate, n-butyl methacrylate, acrylic acid 2-hydroxyethyl, 2-hydroxyethyl methacrylate, maleic acid monomethyl ester, glycidyl acrylate, glycidyl methacrylate, vinyl acetate, acrylamine, acrylamide, and/or other such functional group(s) may be cited as preferred examples, acid-modified polyethylene waxes, acid-modified polypropylene waxes, polyethylene oxidate waxes, polypropylene oxidate waxes, and mixtures thereof, being more preferred thereamong. Particularly preferred as acid modification are maleic acid modification and maleic anhydride modification. Furthermore, preferred as wax oxidates are those in which carboxyl group(s), ketone group(s), and/or hydroxyl group(s) have been introduced.

Furthermore, the acid value of the modified polyolefin wax in accordance with the present embodiment is necessarily not less than 1 mg KOH/g but less than 50 mg KOH/g, is preferably not less than 5 mg KOH/g but less than 40 mg KOH/g, is more preferably not less than 8 mg KOH/g but less than 35 mg KOH/g, and is most preferably not less than 12 mg KOH/g but less than 28 mg KOH/g. Where—as would be the case, for example, with an unmodified polyolefin wax—the acid value is below the lower limit, there will be reduced adhesiveness with respect to printing layers, adhesion layers, hard coat layers, and other such functional layers such as may be laminated to polyester film. Where the acid value is greater than or equal to the upper limit, not only will the heat resistance of the wax be inferior but, due to the loss of effective lubricating effect, there will also be occurrence of scratches during molding and occurrence of inadequate separation from the die.

Furthermore, the weight-average molecular weight of the modified polyolefin wax is necessarily not less than 3,500 but less than 65,000, and is preferably not less than 5,000 but less than 60,000. In particular, in the case of polyethylene wax, not less than 5,000 but less than 20,000 is preferred, and not less than 5,000 but less than 18,000 is more preferred; and in the case of polypropylene wax, not less than 10,000 but less than 60,000 is preferred. Where molecular weight is below the lower limit, cohesion of the wax will be inadequate, and adhesion with respect to other members will be reduced. Where molecular weight exceeds the upper limit, due to the loss of effective lubricating effect, there will be occurrence of scratches during molding and/or occurrence of inadequate separation from the die.

Moreover, the modified polyolefin wax is such that the 3 wt % weight loss onset temperature thereof is necessarily not less than 300° C. If the 3 wt % weight loss onset temperature is less than the lower limit, then, at the time that the film is being formed as a result of passage through appropriate stretching operation(s) following addition to polyester and melting/extrusion thereof, there will be worsening of external appearance as a result of occurrence of defects due to products of thermal degradation of the wax. What is referred to herein as the 3 wt % weight loss onset temperature is the 3 wt % weight loss onset temperature which is the temperature at which the fractional reduction in weight of an 8 mg sample subjected to flowing nitrogen gas (60 ml/min) is 3.0 wt % as measured using a thermogravimetric analyzer (Q50 TGA manufactured by TA Instruments) when temperature is increased at a temperature rise rate of 10° C./min.

The oriented polyester film of the present embodiment is such that content of modified polyolefin wax, as measured based on the weight of the composition in wax-containing layer(s), is not less than 0.1 wt % but less than 3.0 wt %, is preferably within a range that is not less than 0.2 wt % but less than 2.5 wt %, and is more preferably within a range that is not less than 0.3 wt % but less than 2.0 wt %. If content of the modified polyolefin wax is less than the lower limit, it will not be possible to obtain adequate reduction in the coefficient of friction; if the upper limit is exceeded, wax will be exuded to the film surface and cause contamination of film forming operations, and adhesion with respect to other members will be reduced.

It is preferred that the dropping point of the modified polyolefin wax of the present embodiment be within a range that is 100 to 160, and more preferred that this be 110 to 150. If the dropping point of the modified polyolefin wax is below the lower limit, this will be undesirable because wax will be exuded to the film surface at the time that the film is being formed and cause contamination of operations. And if the upper limit is exceeded, effective lubricating effect will be lost and there will be a tendency for there to be occurrence of scratches during molding and/or occurrence of inadequate separation from the die.

There is no particular limitation with respect to the method by which wax is added to the polyester film, it being possible to cite a method in which this is introduced at the extruder together with polyester resin pellets at the time that the film is being formed and in which dispersion of wax and molding of film are carried out simultaneously, or a method in which a kneading and extruding machine is used and master pellets in which wax has been dispersed within polyester resin in advance are mixed with other polyester resin pellets at the time of film formation and these are introduced into the extruder, and so forth; but because it will allow the wax to be more uniformly dispersed throughout the polyester film, the latter is preferred. As such modified polyolefin wax, acid-modified polypropylene waxes including, for example, Umex 5200 manufactured by Sanyo Chemical, Ltd., Umex 5500 manufactured by Sanyo Chemical, Ltd., Umex 1001 manufactured by Sanyo Chemical, Ltd., Umex 1010 manufactured by Sanyo Chemical, Ltd., Umex 100TS manufactured by Sanyo Chemical, Ltd., Umex 110TS manufactured by Sanyo Chemical, Ltd., Licocene PP MA 6452 manufactured by Clariant Chemicals, Licocene PP MA 7452 manufactured by Clariant Chemicals, Licocene PP MA 1332 manufactured by Clariant Chemicals, Licocene PP MA 6252 manufactured by Clariant Chemicals, Hi-Wax NP0555A manufactured by Mitsui Chemicals, Inc., Hi-Wax NP50605A manufactured by Mitsui Chemicals, Inc., the A-0597 Series manufactured by Honeywell, the A-C907 Series manufactured by Honeywell, and A-C950P manufactured by Honeywell; acid-modified polyethylene waxes including, for example, Hi-Wax 2203A manufactured by Mitsui Chemicals, Inc., Hi-Wax 3202A manufactured by Mitsui Chemicals, Inc., Licocene PE MA 4221 manufactured by Clariant Chemicals, Licocene PE MA 4351 manufactured by Clariant Chemicals, the A-C573 Series manufactured by Honeywell, and the A-0575 Series manufactured by Honeywell; and polyethylene oxidate waxes including, for example, Sanwax E-310 manufactured by Sanyo Chemical, Ltd., Sanwax E-330 manufactured by Sanyo Chemical, Ltd., Sanwax E-250P manufactured by Sanyo Chemical, Ltd., Sanwax LEL-400P manufactured by Sanyo Chemical, Ltd., Licolub H 12 manufactured by Clariant Chemicals, Licowax PED 521 manufactured by Clariant Chemicals, Licowax PED 522 manufactured by Clariant Chemicals, Licowax PED 121 manufactured by Clariant Chemicals, Licowax PED 153 manufactured by Clariant Chemicals, Licowax PED 191 manufactured by Clariant Chemicals, Licowax PED 192 manufactured by Clariant Chemicals, Hi-Wax 310MP manufactured by Mitsui Chemicals, Inc., Hi-Wax 320MP manufactured by Mitsui Chemicals, Inc., Hi-Wax 405MP manufactured by Mitsui Chemicals, Inc., Hi-Wax 4051E manufactured by Mitsui Chemicals, Inc., Hi-Wax 4052E manufactured by Mitsui Chemicals, Inc., Hi-Wax 4202E manufactured by Mitsui Chemicals, Inc., Hi-Wax 4252E manufactured by Mitsui Chemicals, Inc., the A-C670 Series manufactured by Honeywell, the A-C673 Series manufactured by Honeywell, the A-C316 Series manufactured by Honeywell, A-C325 manufactured by Honeywell, A-C330 manufactured by Honeywell, A-C392 manufactured by Honeywell, and the A-C395 Series manufactured by Honeywell are commercially available, it being possible to select that or those having the desired acid value(s), weight-average molecular weight(s), and 3 wt % weight loss onset temperature(s) from thereamong.

Dispersion Characteristics of Modified Polyolefin Wax Within Film

Furthermore, it is preferred that the oriented polyester film of the present embodiment be such that modified polyolefin wax is laminarly dispersed within wax-containing layer(s). It is thought that the increase in specific surface area which results from laminar dispersal causes the lubricating effect to be exhibited more effectively. What is referred to herein as laminar means that, when a section obtained by cutting the oriented film in the film thickness direction is observed under scanning electron microscopy at a magnification of 3000×, the average of 10 trials in which the ratio (L/D) between the longest side (L) and the thickness (D) of the body in which the wax has been dispersed is measured is not less than 5. As the method for causing the wax to be laminarly dispersed therewithin, conventionally known film formation methods may be employed to first fabricate the unstretched laminated sheet and to then stretch this one or more times in any desired direction(s). It is preferred at such time that the stretching ratio be 2.0 to 5.0, and more preferred that this be 2.3 to 4.0; and it is preferred that stretching be carried out once in the film forming direction, and once in the direction perpendicular to the film forming direction.

Because the oriented polyester film obtained in this manner will have appropriate stress during molding, it will be possible for it to be more uniformly molded. What is referred to herein as uniformly molded means that during molding there are no concentrated regions at which thickness is low.

Antioxidant

As antioxidant in accordance with the present embodiment, this may be a primary antioxidant that prevents oxidation as a result of capture of radicals that are generated or this may be a secondary antioxidant that prevents oxidation as a result of decomposition of peroxides that are generated, it being possible to cite phenol-type antioxidants and amine-type antioxidants as examples of primary antioxidants, and it being possible to cite phosphorous-type antioxidants and sulfur-type antioxidants as examples of secondary antioxidants.

As specific examples of phenol-type antioxidants, 2,6-di-t-butyl-4-methylphenol, 2,6-di-t-butyl-4-ethylphenol, 2-t-butyl-4-methoxyphenol, 3-t-butyl-4-methoxyphenol, 2,6-di-t-butyl-4-[4,6-bis(octylthio)-1,3,5-triazin-2-ylamino] phenol, n-octadecyl-3-(3,5-di-t-butyl-4-hydroxyphenyl) propionate, and other such monophenol-type antioxidants; 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidenebis(3-methyl-6-t-butylphenol), N,N'-bis[3-(3,5-di-t-butyl-4-hydroxyphenyl)propionyl]hydrazine, N,N'-hexane-1,6-diylbis[3-(3,5-di-t-butyl-4-hydroxyphenyl)propionamide], 3,9-bis[1,1-dimethyl-2-[β-(3-t-butyl-4-hydroxy-5-methylphenyl)propionyloxy]eth yl] 2,4,8,10-tetraoxaspiro[5.5]undecane, and other such bisphenol-type antioxidants; 1,1,3-tris(2-methyl-4-hydroxy-5-t-butylphenyl)butane, 1,3,5-trimethyl-2,4,6-tris(3,5-di-t-butyl-4-hydroxybenzyl)benzene, pentaerythritol tetrakis[3-(3,5-di-t-butyl-4-hydroxyphenyl)propionate], bis[3,3'-bis-(4'-hydroxy-3'-t-butylphenyl)butyric acid] glycol ester, 1,3,5-tris(3',5'-di-t-butyl-4'-hydroxybenzyl)-sec-triazine-2,4,6-(1H,3H,5H)trione, d-α-tocophenol, and other such high-molecular-weight phenol-type antioxidants may be cited as preferred examples.

As specific examples of amine-type antioxidants, alkyl-substituted diphenyl amines and so forth may be cited.

As specific examples of phosphorous-type antioxidants, triphenyl phosphite, diphenyl isodecyl phosphite, phenyl diisodecyl phosphite, 4,4'-butylidene-bis(3-methyl-6-t-butylphenylditridecyl) phosphite, octadecyl phosphite, tris(nonylphenyl) phosphite, diisodecylpentaerythritol diphosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, 10-decyloxy-9,10-dihydro-9-oxa-10-phosphaphenanthrene, tris(2,4-di-t-butylphenyl) phosphite, cyclic neopentanetetrayl bis(2,4-di-t-butylphenyl) phosphite, cyclic neopentanetetrayl bis(2,6-di-t-butyl-4-methylphenyl) phosphite, 2,2'-methylenebis(4,6-di-t-butylphenyl)octyl phosphite, and so forth may be cited as preferred examples.

As specific examples of sulfur-type antioxidants, dilauryl-3,3'-thiodipropionate, dimyristyl-3,3'-thiodipropionate, distearyl-3,3'-thiodipropionate, pentaerythritol tetrakis(3-laurylthiopropionate), 2-mercaptobenzimidazole and so forth may be cited as preferred examples.

As the foregoing antioxidants, commercially available products may be used as is. As specific examples of commercially available products, pentaerythritol tetrakis[3-(3,5-di-t-butyl-4-hydroxyphenyl)propionate] (product name: Irganox 1010; manufactured by Ciba Specialty Chemicals Corporation), N,N'-bis[3-(3,5-di-t-butyl-4-hydroxyphenyl) propionyl]hydrazine (product name: Irganox 1024; manufactured by Ciba Specialty Chemicals Corporation), N,N'-hexane-1,6-diylbis[3-(3,5-di-t-butyl-4-hydroxyphenyl) propionamide] (product name: Irganox 1098; manufactured by Ciba Specialty Chemicals Corporation), and so forth may be cited as more preferred examples.

The oriented film of the present embodiment contains the foregoing antioxidant(s) in an amount that, as measured based on the weight of the composition, is necessarily not less than 0.02 wt % but less than 0.35 wt %, it being more preferred that this is not less than 0.03 wt % but less than 0.30 wt %, it being still more preferred that this is not less than 0.04 wt % but less than 0.25 wt %, and it being most preferred that this is not less than 0.04 wt % but less than 0.2 wt %. If the content thereof is less than 0.02 wt %, then, at the time that the film is being formed as a result of passage through appropriate stretching operation(s) following addition of wax to polyester and melting/extrusion thereof, there will be worsening of external appearance as a result of occurrence of defects due to products of thermal degradation of the wax. In particular, during continuous formation of film, because products of thermal degradation are produced during the period when the molten polyester composition within the extruder has not yet been expelled from the die, and these accumulate over time and enter the film, there is the problem that the external appearance of the film may grow worse over time. If the content thereof is greater than or equal to 0.35 wt %, this will cause excessive amounts of antioxidant to be exuded to the film surface and/or cause contamination of film formation operations, lowering adhesion with respect to other members.

Film Thickness

While thickness of the oriented polyester film of the present embodiment may where necessary be varied as appropriate, it is preferred that thickness of the entirety be within a range that is 10 µm to 200 µm, more preferred that this be within a range that is 15 µm to 150 µm, and still more preferred that this be within a range that is 15 µm to 100 µm. Where thickness exceeds the upper limit, this is uneconomical, as quality will be excessive. Furthermore, below the lower limit, there will be a tendency for wrinkles to occur during molding.

Other Additives

Other additive(s), e.g., fluorescent brightener, antioxidant, thermal stabilizer, ultraviolet light absorber, antistatic agent, and/or the like, may be added as necessary to the oriented polyester film of the present embodiment within such range(s) as will not interfere with the object of the present invention.

Furthermore, to improve handling characteristics during film formation operations and/or molding operations, inert particles may be added thereto. As inert particles that may be contained therein, there is no particular limitation with respect thereto so long as they are capable of existing in stable fashion within polymer, these themselves being such that known items may be employed thereas, use, for example, of inorganic substances such as graphite, talc, kaolin, silica, or the like, or organic substances such as silicone, benzoguanamine, polyacrylonitrile, polytetrafluoroethylene, polymers or copolymers of any of respective monomer(s) selected from among polystyrene, polyacrylic acid methyl ester, polyacrylic acid ethyl ester, polymethacrylic acid methyl ester, polymethacrylic acid ethyl ester, and divinylbenzene, and the like being preferred. It is preferred that particle diameter of such inert particles be 0.1 µm to 10 µm, and it is preferred that the content thereof be within a range that is 0.002 wt % to 0.5 wt %.

Oriented polyester film to which colorant pigment has been added functions as a concealing layer, being useful, when a decorative laminated body in which a printing layer is laminated thereover is laminated over the surface of an exterior part of a car or the like, for making it possible for the design of the printing layer to be expressed without being influenced by the external appearance of the exterior part of the car or the like. While either inorganic- or organic-type colorant pigment(s) may be employed, those of the inorganic type are preferred. As inorganic-type pigment, alumina, titanium dioxide, aluminum, calcium carbonate, barium sulfate, and so forth may be cited as preferred examples, titanium dioxide having an average particle diameter of 100 nm to 500 nm being preferred thereamong. It is preferred that content of said colorant pigment, as measured based on the weight of the composition, be greater than 5 wt % but not greater than 40 wt %, and more preferred that content thereof be in a range that is 10 wt % to 30 wt %. If content of colorant pigment is less than or equal to the lower limit, concealment will be inferior; above the upper limit, the film will become brittle and there will be an increased tendency for breakage of the film to occur during stretching of the film.

Multilayer Film

The oriented polyester film of the present embodiment may have a multilayer structure, in which case it is necessary that content of the modified polyolefin wax at a surface layer (Surfacial Layer A) on at least one side thereof, as measured based on the weight of the composition at the surface layer (Surfacial Layer A), be not less than 0.1 wt % but less than 3.0 wt %, that said modified polyolefin wax be such that the acid value thereof is not less than 1 mg KOH/g but less than 50 mg KOH/g, the 3 wt % weight loss onset temperature thereof is not less than 300° C., the weight-average molecular weight thereof is within a range that is 3,500 to 65,000, and content of antioxidant therein, as measured based on the weight of the composition, is not less than 0.02 wt % but less than 0.35 wt %. Note that the surface layer (Surfacial Layer A) may comprise the composition.

Where the oriented polyester film contains colorant pigment, it is preferred that this be in an A/B/A or AB multilayer structure in which Surfacial Layer(s) A wherein content of colorant pigment, as measured based on the weight of the composition, is less than 5 wt %, is or are laminated to one or both sides of a Core Layer B wherein content of colorant pigment, as measured based on the weight of the composition, is not less than 5 wt % but less than 30 wt %. Where there is only a Core Layer B, this is not preferred, as there would be increased tendency for cracking to occur during stretching of the film, which could lead to breakage.

From the standpoint of achieving appropriate balance between surface lubricity and concealment, it is preferred that the ratio ($X_A/X_B$, where $X_A$ is total Surfacial Layer A thickness, and $X_B$ is total Surfacial Layer B thickness) between the thicknesses of Surfacial Layer(s) A and Core Layer B be 0.10 to 0.60, more preferred that this be 0.15 to 0.55, and still more preferred that this be 0.20 to 0.45.

Manufacturing Method

There being no particular limitation with respect to the method for manufacturing the oriented polyester film of the present embodiment which is described above, conventionally known film formation methods may be employed to first fabricate the unstretched laminated sheet and to then stretch this one or more times in any desired direction(s). It is preferred at such time that stretching be carried out once in the film forming direction, and once in the direction perpendicular to the film forming direction.

For example, a kneading and extruding machine might be used to fabricate in advance Master Pellets A in which polyester resin pellets and modified polyolefin wax have been kneaded together, and Master Pellets B in which polyester resin pellets and antioxidant have been kneaded together, and a blender might then be used to mix Master Pellets A and B together with polyester resin pellets for dilution, and this might be adequately dried, following which this might be melted within an extruder at a temperature that is between the melting point and (the melting point+50°) C. Note that the melting point here is the melting point of the polyester that is used. Manufacture may then be carried out by causing the molten resin to be molded in the form of a sheet by means of a die, and causing the unstretched sheet that is obtained to be subjected to sequential or simultaneous biaxial stretching, and to be subjected to heat-setting. Where film formation is carried out by means of sequential biaxial stretching, the unstretched laminated sheet is heated by heating it with a roll, heating it with infrared light, or the like, and is first stretched in the longitudinal direction, following which a stenter is used to stretch it in the lateral direction. At this time, it is preferred that the stretching temperature be a temperature that is 20° to 50° C. higher than the glass transition temperature Tg of the polyester; it is preferred that the longitudinal stretching ratio be within a range that is 2.0 to 5.0, more preferred that this be 2.2 to 4.0, and still more preferred that this be 2.4 to 3.5; and it is preferred that the lateral stretching ratio be within a range that is 2.5 to 5.0, more preferred that this be 2.6 to 4.0, and still more preferred that this be 2.6 to 3.7. It is preferred that the heat-setting temperature be 150° to 240° C., and more preferred that it be within a range that is 150° to 230° C. and that it be chosen so as to cause film quality to be adjusted in correspondence to the melting point of the polyester.

Decorative Laminated Body

As an example of what is meant by the decorative laminated body of the present embodiment, a decorative laminated body having an oriented polyester film in accordance with the present embodiment, and having at least one functional layer selected from among the group consisting of printing layer, hard coat layer, adhesion layer, and mold release layer provided on at least one face thereof, may be cited. In addition, with respect to the printing layer(s), hard coat layer(s), adhesion layer(s), and mold release layer(s), these themselves are such that known items may be employed thereas, adhesiveness thereof being excellent due to the fact that certain modified polyolefin wax(es) are used in the present embodiment. The decorative laminated body may be such that, with respect to the external appearance such as may be discerned by viewing it, the external appearance thereof has a base, coating/clear, or coating finish.

WORKING EXAMPLES

Although the present invention is described in detail below in terms of working examples, it should be understood that the present invention is not limited to only these working examples. Note that values for the various properties were measured in accordance with the methods given below. Furthermore, except where otherwise stated, the parts and percents appearing in the working examples respectively indicate parts by weight and percents by weight.

Melting Point

Measurement of melting point of polyester was carried out in accordance with a method in which melting peak was determined using a TA Instruments Q100 DSC at a temperature rise rate of 20° C./minute. Note that 10-mg samples obtained by scraping the polyester composition from each of the respective film layers were used.

Intrinsic Viscosity

Polyester composition scraped from each of the respective film layers was dissolved in 25 ml of o-chlorophenol, following which this was first cooled before colorant pigment and so forth was removed therefrom using a centrifugal separator, calculations for this solution being performed by plotting a calibration curve based on the viscosity of the solution as measured under conditions such that temperature was 35° C. using an Ostwald-type viscosity tube.

Thicknesses of Respective Film Layers

Samples 2 mm in the long direction and 2 cm in the width direction were cut therefrom and secured within embedding capsules, following which embedding was carried out using epoxy resin. In addition, a microtome (Supercut manufactured by Reichert-Jung) was used to cut the embedded samples perpendicularly with respect to the width direction to obtain thin-film sections that were 50 μm in thickness. A scanning electron microscope (Hitachi 4300 SE/N) was used to carry out observation and photography at an acceleration voltage of 20 kV, measurement of thickness of respective layers being carried out based on photographs, thickness being determined as the average of 5 points.

3 Wt % Weight Loss Onset Temperature

The temperature at which the fractional reduction in weight of an 8 mg sample subjected to flowing nitrogen gas (60 ml/min) was 3.0 wt % as measured using a thermogravimetric analyzer (Q50 TGA manufactured by TA Instruments) when temperature was increased at a temperature rise rate of 10° C./min was taken to be the 3 wt % weight loss onset temperature.

Acid Value

Measurement was carried out in accordance with JIS K 5902.

Colorant Pigment Concentration

Approximately 1 g to 2 g of polyester composition scraped from each of the respective film layers was placed in a ceramic crucible, and this was heated for not less than 6 hours at 600° C. within an electric dryer, following which the weight of the ash that remained in the crucible was divided by the weight of the original polyester composition to determine the colorant pigment concentration. Colorant pigment concentration within the entirety of the film was calculated in accordance with a similar method using 1 g of biaxially stretched polyester film obtained following film formation.

Antioxidant Concentration 10 mg was scraped from the film surface layer, high-performance liquid chromatography was used to separate the respective components, and concentration was calculated by plotting a calibration curve based on the antioxidant peak area.

Coefficient of Friction

A sled-type measurement apparatus manufactured by Toyo Tester was used in accordance with ASTM D1894-63 to measure the static coefficient of friction (μs) between the front and back faces of the film (for laminated film, between mutual wax-containing layer surfaces). Note that a polycarbonate sled was employed, and load was 200 g.

EXCELLENT=Static coefficient of friction was less than 0.30

GOOD=Static coefficient of friction was greater than or equal to 0.30 but less than 0.40

BAD=Static coefficient of friction was greater than or equal to 0.40

Adhesiveness

Adhesiveness with respect to UV ink was evaluated.

An RI tester (manufactured by Akira Seisakusho) was used to print a known ultraviolet-curable printing ink (Flash Dry FD Karton P Magenta Ro manufactured by Toyo Ink) on the wax-containing layer face of oriented film, following which this was cured using a medium-pressure mercury lamp (80 W/cm, single-lamp-type; manufactured by Nippon Denchi) UV curing device to form a UV ink layer of thickness 4 μm. A strip of cellophane tape (width 18 mm; manufactured by Nichiban) 15 cm in length was applied over this UV ink layer, a 2 kg manually loaded roll was used to apply a constant load thereto from above, and the film was secured as one end of the cellophane tape was peeled off therefrom in a direction that was 90° with respect thereto to evaluate the peel adhesiveness thereof. Adhesiveness was evaluated based on the following criteria.

EXCELLENT=There was absolutely no delamination of the ink layer (0%)
GOOD=Less than 10% of the ink layer delaminated
BAD=10% or more of the ink layer delaminated External Appearance of Film Molten polyester was continuously extruded from a die under the conditions indicated at the following respective Working Examples, and longitudinal stretching and lateral stretching were carried out to continuously form oriented film. The film was observed at 30 minutes and 90 minutes following the start of extrusion, the number of defects of diameter 100 μm and larger that were present within a 500-cubic-millimeter region was counted, the increase in defect frequency, i.e., the increase in the number of defects per hour, was calculated, and evaluation was carried out based on the following criteria.

EXCELLENT=Increase in defect frequency, i.e., increase in number of defects per hour, was less than 30 defects/500 cubic millimeters
GOOD=Increase in defect frequency, i.e., increase in number of defects per hour, was less than 50 defects/500 cubic millimeters
BAD=Increase in defect frequency, i.e., increase in number of defects per hour, was greater than or equal to 50 defects/500 cubic millimeters Raw Materials Employed Polyester A:Polyester for dilution; polyethylene terephthalate copolymerized with 2 mol % isophthalic acid containing 2.5 mol % diethylene glycol with melting point 245° C. and intrinsic viscosity 0.75

Polyester B:Composition in which ratio between Polyester A and acid-modified polypropylene wax (3% weight loss onset temperature 321° C.; acid value 26 mg KOH/g; weight-average molecular weight 45,000), expressed as a wt % ratio, was 95:5

Polyester C: Composition in which ratio between Polyester A and acid-modified polypropylene wax (3% weight loss onset temperature 321° C.; acid value 45 mg KOH/g; weight-average molecular weight 18,000), expressed as a wt % ratio, was 95:5

Polyester D: Composition in which ratio between Polyester A and polyethylene oxidate wax (3% weight loss onset temperature 332° C.; acid value 15 mg KOH/g; weight-average molecular weight 12,000), expressed as a wt % ratio, was 95:5

Polyester E: Polyester for dilution; polyethylene terephthalate copolymerized with 12 mol % isophthalic acid containing 1.0 mol % diethylene glycol with melting point 225° C. and intrinsic viscosity 0.66

Polyester F: Polyester for dilution; polyethylene terephthalate containing 2.5 mol % diethylene glycol with melting point 252° C. and intrinsic viscosity 0.80

Polyester G: Composition in which ratio between Polyester A and polyethylene oxidate wax (3% weight loss onset temperature 314° C.; acid value 22 mg KOH/g; weight-average molecular weight 8,800), expressed as a wt % ratio, was 95:5

Polyester H: Composition in which ratio between Polyester A and polyethylene wax (3% weight loss onset temperature 395° C.; acid value 0 mg KOH/g; weight-average molecular weight 18,000), expressed as a wt % ratio, was 95:5

Polyester I: Composition in which ratio between Polyester A and montan ester wax (3% weight loss onset temperature 281° C.; acid value 13 mg KOH/g), expressed as a wt % ratio, was 95:5

Polyester J: Composition in which ratio between Polyester A and acid-modified polypropylene wax (3% weight loss onset temperature 350° C.; acid value 11 mg KOH/g; weight-average molecular weight 70,000), expressed as a wt % ratio, was 95:5

Polyester K: Composition in which ratio between Polyester A and acid-modified polyethylene wax (3% weight loss onset temperature 297° C.; acid value 30 mg KOH/g; weight-average molecular weight 2,700), expressed as a wt % ratio, was 95:5

Polyester L: Composition in which ratio between Polyester A and acid-modified polypropylene wax (3% weight loss onset temperature 274° C.; acid value 3.5 mg KOH/g; weight-average molecular weight 9,000), expressed as a wt % ratio, was 95:5

Polyester M: Composition in which ratio between Polyester A and phenol-type antioxidant (2,4,6-tris(3',5'-di-tert-butyl-4'-hydroxybenzyl)mesitylene), expressed as a wt % ratio, was 99:1

Polyester N: Composition in which ratio between Polyester A and phenol-type antioxidant (pentaerythritol tetrakis [3-(3,5-di-tert-butyl-4-hydroxyphenyl)propionate]), expressed as a wt % ratio, was 99:1

Polyester O: Composition in which ratio between Polyester A and phosphate-type antioxidant (tris(2,4-di-tert-butylphenyl) phosphite), expressed as a wt % ratio, was 99:1

Working Examples 1-42; Comparative Examples 1-15

A blender was used to mix and dry polyester for dilution, wax master polyester, and antioxidant master polyester of the types and in the blending ratios listed at TABLE 1, following which this was extruded from a die at 280° C., and this was quenched and allowed to solidify to obtain unstretched film. Next, this unstretched film was longitudinally stretched by a factor of 3.0× at 100° C., and was thereafter laterally stretched by a factor of 3.5× at 130° C., and this was then subjected to heat-setting at 180° C. to obtain oriented polyester film of thickness 50 μm. Results of evaluation of the oriented polyester film that was obtained are shown in TABLE 2.

Working Example 43

To obtain a two-layer laminated polyester film, a polyester composition similar to that at Working Example 1 was melted at 280° C. for Layer A, and a different extruder was used to melt only Polyester A at 280° C. for Layer B, following which a two-layer feed block was used to laminate these in a two-layer A/B constitution, coextrusion being carried out by adjacent dies, and this was quenched and allowed to solidify to obtain unstretched laminated film. Next, under similar conditions as at Working Example 1, this unstretched film was longitudinally stretched, and was laterally stretched, and was then subjected to heat-setting to obtain oriented polyester film. The thicknesses of the respective layers were respectively 20 μm/30 μm. Results of evaluation of the oriented polyester film that was obtained were similar to those at Working Example 1 in TABLE 2.

Working Example 44

To obtain a three-layer laminated polyester film, a polyester composition similar to that at Working Example 19 was melted at 280° C. for Layer A, and for Layer B a different extruder was used to melt at 280° C. a polyester composition in which, as measured based on the weight of the composition, 20 wt % of colorant pigment in the form of rutile titanium oxide (average particle diameter 0.5 μm) had been added to Polyester A, following which a three-layer feed block was used to laminate these in a three-layer A/B/A constitution, coextrusion being carried out by adjacent dies, and this was quenched and allowed to solidify to obtain unstretched laminated film. Next, under similar conditions as at Working Example 1, this unstretched film was longitudinally stretched, and was laterally stretched, and was then subjected to heat-setting to obtain oriented polyester film. The thicknesses of the respective layers were respectively 3 μm/19 μm/3 μm, and concentration of colorant pigment in the oriented film was 15 wt %. Results of evaluation of the oriented polyester film that was obtained were similar to those at Working Example 19 in TABLE 2.

Comparative Example 16

In similar fashion as at Working Example 1, Polyester A, Polyester B, and Polyester M—in the blending ratio listed at TABLE 1—were extruded in molten form from a die at 280° C., and this was quenched and allowed to solidify, at which time the amount expelled therefrom was suppressed to obtain unstretched film of thickness 50 μm. The polyester film that was obtained was unoriented, results of evaluation thereof being shown in TABLE 2

TABLE 1

TABLE 1A

| | Polyester for dilution | | | | Wax master polyester | | | | | | Antioxidant master polyester | | | | | Oriented polyester film | | | | | |
|---|---|---|---|---|---|---|---|---|---|---|---|---|---|---|---|---|---|---|---|---|---|
| | Type | Melting point (° C.) | Intrinsic viscosity (dL/g) | Blending ratio (wt. %) | Type | Melting point (° C.) | Intrinsic viscosity (dL/g) | Type of wax | Blending ratio (wt. %) | Type | Melting point (° C.) | Intrinsic viscosity (dL/g) | Type of antioxidant | Blending ratio (wt. %) | Melting point (° C.) | Intrinsic viscosity (dL/g) | Wax dispersion profile | Wax concentration as measured based on weight of composition (wt. %) | Antioxidant concentration as measured based on weight of composition | Weight-average weight of wax | 3 wt % weight loss onset temperature of wax (° C.) |
| Working Example 1 | A | 245 | 0.75 | 72 | B | 245 | 0.60 | a | 20 | M | 245 | 0.65 | α | 8 | 245 | 0.68 | Laminar | 1.00 | 0.06 | 45000 | 321 |
| Working Example 2 | A | 245 | 0.75 | 90 | B | 245 | 0.60 | a | 2 | M | 245 | 0.65 | α | 8 | 245 | 0.71 | Laminar | 0.10 | 0.06 | 45000 | 321 |
| Working Example 3 | A | 245 | 0.75 | 32 | B | 245 | 0.60 | a | 60 | M | 245 | 0.65 | α | 8 | 245 | 0.62 | Laminar | 3.00 | 0.06 | 45000 | 321 |
| Working Example 4 | A | 245 | 0.75 | 72 | C | 245 | 0.58 | a | 20 | M | 245 | 0.65 | α | 8 | 245 | 0.68 | Laminar | 1.00 | 0.06 | 18000 | 329 |
| Working Example 5 | A | 245 | 0.75 | 88 | C | 245 | 0.58 | a | 4 | M | 245 | 0.65 | α | 8 | 245 | 0.71 | Laminar | 0.20 | 0.06 | 18000 | 329 |
| Working Example 6 | A | 245 | 0.75 | 52 | C | 245 | 0.58 | a | 40 | M | 245 | 0.65 | α | 8 | 245 | 0.64 | Laminar | 2.00 | 0.06 | 18000 | 329 |
| Working Example 7 | A | 245 | 0.75 | 72 | D | 245 | 0.61 | b | 20 | M | 245 | 0.65 | α | 8 | 245 | 0.68 | Laminar | 1.00 | 0.06 | 12000 | 332 |
| Working Example 8 | A | 245 | 0.75 | 90 | D | 245 | 0.61 | b | 2 | M | 245 | 0.65 | α | 8 | 245 | 0.71 | Laminar | 0.10 | 0.06 | 12000 | 332 |
| Working Example 9 | A | 245 | 0.75 | 32 | D | 245 | 0.61 | b | 60 | M | 245 | 0.65 | α | 8 | 245 | 0.68 | Laminar | 3.00 | 0.06 | 12000 | 332 |
| Working Example 10 | A | 245 | 0.75 | 72 | G | 245 | 0.60 | b | 20 | M | 245 | 0.65 | α | 8 | 245 | 0.68 | Laminar | 1.00 | 0.06 | 8800 | 314 |
| Working Example 11 | A | 245 | 0.75 | 72 | G | 245 | 0.60 | b | 20 | M | 245 | 0.65 | α | 8 | 245 | 0.68 | Laminar | 1.00 | 0.06 | 8800 | 314 |
| Working Example 12 | A | 245 | 0.75 | 72 | G | 245 | 0.60 | a | 20 | M | 245 | 0.65 | α | 8 | 245 | 0.68 | Laminar | 1.00 | 0.06 | 8800 | 314 |
| Working Example 13 | A | 245 | 0.75 | 72 | B | 245 | 0.60 | a | 20 | N | 245 | 0.65 | α | 8 | 245 | 0.68 | Laminar | 1.00 | 0.06 | 45000 | 321 |
| Working Example 14 | A | 245 | 0.75 | 90 | B | 245 | 0.60 | a | 2 | N | 245 | 0.65 | α | 8 | 245 | 0.71 | Laminar | 0.10 | 0.06 | 45000 | 321 |
| Working Example 15 | A | 245 | 0.75 | 32 | B | 245 | 0.60 | a | 65 | N | 245 | 0.65 | α | 8 | 245 | 0.60 | Laminar | 3.00 | 0.06 | 45000 | 321 |
| Working Example 16 | A | 245 | 0.75 | 72 | C | 245 | 0.58 | a | 20 | N | 245 | 0.65 | α | 8 | 245 | 0.68 | Laminar | 1.00 | 0.06 | 18000 | 329 |

TABLE 1-continued

| | | | | | | | | | | | | | | | | | | | | | |
|---|---|---|---|---|---|---|---|---|---|---|---|---|---|---|---|---|---|---|---|---|---|
| Working Example 17 | A | 245 | 0.75 | 88 | C | 245 | 0.58 | a | 4 | N | 245 | 0.65 | α | 8 | 245 | 0.71 | Laminar | 0.20 | 0.06 | 18000 | 329 |
| Working Example 18 | A | 245 | 0.75 | 52 | C | 245 | 0.58 | a | 40 | N | 245 | 0.65 | α | 8 | 245 | 0.64 | Laminar | 2.00 | 0.06 | 18000 | 329 |
| Working Example 19 | A | 245 | 0.75 | 72 | D | 245 | 0.61 | b | 20 | N | 245 | 0.65 | α | 8 | 245 | 0.68 | Laminar | 1.00 | 0.06 | 12000 | 332 |
| Working Example 20 | A | 245 | 0.75 | 90 | D | 245 | 0.61 | b | 2 | N | 245 | 0.65 | α | 8 | 245 | 0.71 | Laminar | 0.10 | 0.06 | 12000 | 332 |
| Working Example 21 | A | 245 | 0.75 | 32 | D | 245 | 0.61 | b | 60 | N | 245 | 0.65 | α | 8 | 245 | 0.63 | Laminar | 3.00 | 0.06 | 12000 | 332 |
| Working Example 22 | A | 245 | 0.75 | 72 | G | 245 | 0.60 | b | 20 | N | 245 | 0.65 | α | 8 | 245 | 0.68 | Laminar | 1.00 | 0.06 | 8800 | 314 |
| Working Example 23 | A | 245 | 0.75 | 72 | G | 245 | 0.60 | b | 20 | N | 245 | 0.65 | α | 8 | 245 | 0.68 | Laminar | 1.00 | 0.06 | 8800 | 314 |
| Working Example 24 | A | 245 | 0.75 | 72 | G | 245 | 0.60 | b | 20 | N | 245 | 0.65 | α | 8 | 245 | 0.68 | Laminar | 1.00 | 0.06 | 8800 | 314 |
| Working Example 25 | A | 245 | 0.75 | 90 | B | 245 | 0.60 | a | 20 | O | 245 | 0.65 | β | 8 | 245 | 0.71 | Laminar | 0.10 | 0.06 | 45000 | 321 |
| Working Example 26 | A | 245 | 0.75 | 32 | B | 245 | 0.60 | a | 2 | O | 245 | 0.65 | β | 8 | 245 | 0.62 | Laminar | 3.00 | 0.06 | 45000 | 321 |
| Working Example 27 | A | 245 | 0.75 | 72 | C | 245 | 0.58 | a | 60 | O | 245 | 0.65 | β | 8 | 245 | 0.68 | Laminar | 1.00 | 0.06 | 45000 | 321 |
| Working Example 28 | A | 245 | 0.75 | 88 | C | 245 | 0.58 | a | 20 | O | 245 | 0.65 | β | 8 | 245 | 0.71 | Laminar | 0.20 | 0.06 | 18000 | 329 |
| Working Example 29 | A | 245 | 0.75 | 52 | C | 245 | 0.58 | a | 4 | O | 245 | 0.65 | β | 8 | 245 | 0.64 | Laminar | 2.00 | 0.06 | 18000 | 329 |
| Working Example 30 | A | 245 | 0.75 | 72 | D | 245 | 0.61 | b | 40 | O | 245 | 0.65 | β | 8 | 245 | 0.68 | Laminar | 1.00 | 0.06 | 18000 | 329 |
| Working Example 31 | A | 245 | 0.75 | 90 | D | 245 | 0.61 | b | 20 | O | 245 | 0.65 | β | 8 | 245 | 0.71 | Laminar | 0.10 | 0.06 | 12000 | 332 |
| Working Example 32 | A | 245 | 0.75 | 32 | D | 245 | 0.61 | b | 2 | O | 245 | 0.65 | β | 8 | 245 | 0.63 | Laminar | 3.00 | 0.06 | 12000 | 332 |
| Working Example 33 | A | 245 | 0.75 | 72 | G | 245 | 0.60 | b | 60 | O | 245 | 0.65 | β | 8 | 245 | 0.68 | Laminar | 1.00 | 0.06 | 12000 | 332 |
| Working Example 34 | A | 245 | 0.75 | 72 | G | 245 | 0.60 | b | 20 | O | 245 | 0.65 | β | 8 | 245 | 0.68 | Laminar | 1.00 | 0.06 | 8800 | 314 |
| Working Example 35 | A | 245 | 0.75 | 72 | G | 245 | 0.60 | b | 20 | O | 245 | 0.65 | β | 8 | 245 | 0.68 | Laminar | 1.00 | 0.06 | 8800 | 314 |
| Working Example 36 | A | 245 | 0.75 | 72 | G | 245 | 0.60 | a | 20 | O | 245 | 0.65 | β | 8 | 245 | 0.62 | Laminar | 1.00 | 0.06 | 8800 | 314 |
| Working Example 37 | A | 245 | 0.75 | 50 | D | 245 | 0.61 | a | 20 | N | 245 | 0.65 | β | 30 | 245 | 0.66 | Laminar | 1.00 | 0.29 | 12000 | 332 |
| Working Example 38 | A | 245 | 0.75 | 77 | D | 245 | 0.61 | b | 20 | N | 245 | 0.65 | β | 3 | 245 | 0.69 | Laminar | 1.00 | 0.02 | 12000 | 332 |
| Working Example 39 | A | 245 | 0.75 | 50 | B | 245 | 0.60 | a | 20 | O | 245 | 0.65 | β | 30 | 245 | 0.66 | Laminar | 1.00 | 0.24 | 45000 | 321 |
| Working Example 40 | A | 245 | 0.75 | 77 | B | 245 | 0.60 | b | 20 | O | 245 | 0.65 | β | 3 | 245 | 0.69 | Laminar | 1.00 | 0.02 | 45000 | 321 |
| Working Example 41 | E | 225 | 0.66 | 72 | D | 245 | 0.61 | b | 20 | O | 245 | 0.65 | β | 8 | 245 | 0.62 | Laminar | 1.00 | 0.06 | 12000 | 332 |
| Working Example 42 | F | 252 | 0.80 | 72 | D | 245 | 0.61 | b | 20 | O | 245 | 0.65 | β | 8 | 245 | 0.72 | Laminar | 1.00 | 0.06 | 12000 | 332 |

TABLE 1-continued

TABLE 1B

| | Polyester for dilution | | | Wax master polyester | | | | | Antioxidant master polyester | | | | | Oriented polyester film | | | | |
|---|---|---|---|---|---|---|---|---|---|---|---|---|---|---|---|---|---|---|
| | Type | Melting point (°C.) | Intrinsic viscosity (dL/g) | Blending ratio (wt. %) | Type | Melting point (°C.) | Intrinsic viscosity (dL/g) | Type of wax | Blending ratio (wt. %) | Type | Melting point (°C.) | Intrinsic viscosity (dL/g) | Type of antioxidant | Blending ratio (wt. %) | Melting point (°C.) | Intrinsic viscosity (dL/g) | Wax dispersion profile | Wax concentration as measured based on weight of composition (wt. %) | Antioxidant concentration as measured based on weight of composition | Weight-average weight of wax | 3 wt % weight loss onset temperature of wax (°C.) |
| Comparative Example 1 | A | 245 | 0.75 | 91 | B | 245 | 0.60 | a | 1 | O | 245 | 0.65 | β | 8 | 245 | 0.71 | Laminar | 0.05 | 0.06 | 45000 | 321 |
| Comparative Example 2 | A | 245 | 0.75 | 12 | B | 245 | 0.60 | a | 80 | O | 245 | 0.65 | β | 8 | 245 | 0.59 | Laminar | 4.00 | 0.06 | 45000 | 321 |
| Comparative Example 3 | A | 245 | 0.75 | 91 | C | 245 | 0.58 | a | 1 | O | 245 | 0.65 | β | 8 | 245 | 0.71 | Laminar | 0.05 | 0.06 | 18000 | 329 |
| Comparative Example 4 | A | 245 | 0.75 | 12 | C | 245 | 0.58 | a | 80 | O | 245 | 0.65 | β | 8 | 245 | 0.58 | Laminar | 4.00 | 0.06 | 18000 | 329 |
| Comparative Example 5 | A | 245 | 0.75 | 91 | D | 245 | 0.61 | b | 1 | O | 245 | 0.65 | β | 8 | 245 | 0.71 | Laminar | 0.05 | 0.06 | 12000 | 332 |
| Comparative Example 6 | A | 245 | 0.75 | 12 | D | 245 | 0.61 | b | 80 | O | 245 | 0.65 | β | 8 | 245 | 0.60 | Laminar | 4.00 | 0.06 | 12000 | 332 |
| Comparative Example 7 | A | 245 | 0.75 | 72 | H | 245 | 0.60 | c | 20 | O | 245 | 0.65 | β | 8 | 245 | 0.68 | Laminar | 1.00 | 0.06 | 18000 | 395 |
| Comparative Example 8 | A | 245 | 0.75 | 72 | I | 245 | 0.55 | d | 20 | O | 245 | 0.65 | β | 8 | 245 | 0.68 | Laminar | 1.00 | 0.06 | — | 281 |
| Comparative Example 9 | A | 245 | 0.75 | 72 | J | 245 | 0.60 | a | 20 | O | 245 | 0.65 | β | 8 | 245 | 0.68 | Laminar | 1.00 | 0.06 | 70000 | 350 |
| Comparative Example 10 | A | 245 | 0.75 | 72 | K | 245 | 0.58 | e | 20 | O | 245 | 0.65 | β | 8 | 245 | 0.68 | Laminar | 1.00 | 0.06 | 3200 | 297 |
| Comparative Example 11 | A | 245 | 0.75 | 72 | L | 245 | 0.60 | b | 20 | O | 245 | 0.65 | β | 8 | 245 | 0.68 | Laminar | 1.00 | 0.06 | 9000 | 274 |
| Comparative Example 12 | A | 245 | 0.75 | 30 | D | 245 | 0.61 | b | 20 | N | 245 | 0.65 | α | 50 | 245 | 0.64 | Laminar | 1.00 | 0.40 | 12000 | 332 |
| Comparative Example 13 | A | 245 | 0.75 | 78 | D | 245 | 0.61 | b | 20 | N | 245 | 0.65 | α | 2 | 245 | 0.69 | Laminar | 1.00 | 0.01 | 12000 | 332 |
| Comparative Example 14 | A | 245 | 0.75 | 50 | B | 245 | 0.60 | a | 20 | O | 245 | 0.65 | β | 50 | 245 | 0.64 | Laminar | 1.00 | 0.40 | 45000 | 321 |
| Comparative Example 15 | A | 245 | 0.75 | 78 | B | 245 | 0.60 | a | 20 | O | 245 | 0.65 | β | 2 | 245 | 0.69 | Laminar | 1.00 | 0.01 | 45000 | 321 |

TABLE 1-continued

| Comparative Example 16 | A | 245 | 0.75 | 72 | B | 245 | 0.60 | a | 25 | M | 245 | 0.65 | α | 8 | 245 | 0.68 | Spherical | 1.00 | 0.06 | 45000 | 321 |
|---|---|---|---|---|---|---|---|---|---|---|---|---|---|---|---|---|---|---|---|---|---|

A: Polyester A
B: Polyester B
C: Polyester C
D: Polyester D
E: Polyester E
G: Polyester G
H: Polyester H
I: Polyester I
J: Polyester J
K: Polyester K
L: Polyester L
M: Polyester M
N: Polyester N
O: Polyester O
a: acid-modified polypropylene
b: polyethylene oxidate
c: polyethylene
d: montan ester
e: acid-modified polyethylene
α: phenol-type
β: phosphate-type

TABLE 2

|  | Coefficient of friction | Adhesiveness | External appearance of film |
|---|---|---|---|
| A |  |  |  |
| Working Example 1 | EXCELLENT | EXCELLENT | EXCELLENT |
| Working Example 2 | GOOD | EXCELLENT | EXCELLENT |
| Working Example 3 | EXCELLENT | GOOD | EXCELLENT |
| Working Example 4 | EXCELLENT | EXCELLENT | EXCELLENT |
| Working Example 5 | GOOD | EXCELLENT | EXCELLENT |
| Working Example 6 | EXCELLENT | GOOD | EXCELLENT |
| Working Example 7 | EXCELLENT | EXCELLENT | EXCELLENT |
| Working Example 8 | GOOD | EXCELLENT | EXCELLENT |
| Working Example 9 | EXCELLENT | GOOD | EXCELLENT |
| Working Example 10 | EXCELLENT | EXCELLENT | EXCELLENT |
| Working Example 11 | GOOD | EXCELLENT | EXCELLENT |
| Working Example 12 | EXCELLENT | GOOD | EXCELLENT |
| Working Example 13 | EXCELLENT | EXCELLENT | EXCELLENT |
| Working Example 14 | GOOD | EXCELLENT | EXCELLENT |
| Working Example 15 | EXCELLENT | GOOD | EXCELLENT |
| Working Example 16 | EXCELLENT | EXCELLENT | EXCELLENT |
| Working Example 17 | GOOD | EXCELLENT | EXCELLENT |
| Working Example 18 | EXCELLENT | GOOD | EXCELLENT |
| Working Example 19 | EXCELLENT | EXCELLENT | EXCELLENT |
| Working Example 20 | GOOD | EXCELLENT | EXCELLENT |
| Working Example 21 | EXCELLENT | GOOD | EXCELLENT |
| Working Example 22 | EXCELLENT | EXCELLENT | EXCELLENT |
| Working Example 23 | GOOD | EXCELLENT | EXCELLENT |
| Working Example 24 | EXCELLENT | GOOD | EXCELLENT |
| Working Example 25 | EXCELLENT | EXCELLENT | EXCELLENT |
| Working Example 26 | GOOD | EXCELLENT | EXCELLENT |
| Working Example 27 | EXCELLENT | GOOD | EXCELLENT |
| Working Example 28 | EXCELLENT | EXCELLENT | EXCELLENT |
| Working Example 29 | GOOD | EXCELLENT | EXCELLENT |
| Working Example 30 | EXCELLENT | GOOD | EXCELLENT |
| Working Example 31 | EXCELLENT | EXCELLENT | EXCELLENT |
| Working Example 32 | GOOD | EXCELLENT | EXCELLENT |
| Working Example 33 | EXCELLENT | GOOD | EXCELLENT |
| Working Example 34 | EXCELLENT | EXCELLENT | EXCELLENT |
| Working Example 35 | GOOD | EXCELLENT | EXCELLENT |
| Working Example 36 | EXCELLENT | GOOD | EXCELLENT |
| Working Example 37 | EXCELLENT | GOOD | EXCELLENT |
| Working Example 38 | EXCELLENT | EXCELLENT | GOOD |
| Working Example 39 | EXCELLENT | GOOD | EXCELLENT |
| Working Example 40 | EXCELLENT | EXCELLENT | GOOD |
| Working Example 41 | EXCELLENT | EXCELLENT | EXCELLENT |
| Working Example 42 | EXCELLENT | EXCELLENT | EXCELLENT |
| B |  |  |  |
| Comparative Example 1 | BAD | EXCELLENT | EXCELLENT |
| Comparative Example 2 | EXCELLENT | BAD | GOOD |
| Comparative Example 3 | BAD | EXCELLENT | EXCELLENT |
| Comparative Example 4 | EXCELLENT | BAD | GOOD |
| Comparative Example 5 | BAD | EXCELLENT | EXCELLENT |
| Comparative Example 6 | EXCELLENT | BAD | GOOD |
| Comparative Example 7 | EXCELLENT | BAD | EXCELLENT |
| Comparative Example 8 | GOOD | BAD | BAD |
| Comparative Example 9 | BAD | EXCELLENT | EXCELLENT |
| Comparative Example 10 | EXCELLENT | BAD | GOOD |
| Comparative Example 11 | EXCELLENT | GOOD | BAD |
| Comparative Example 12 | BAD | EXCELLENT | EXCELLENT |
| Comparative Example 13 | EXCELLENT | BAD | EXCELLENT |
| Comparative Example 14 | EXCELLENT | EXCELLENT | BAD |
| Comparative Example 15 | EXCELLENT | BAD | EXCELLENT |
| Comparative Example 16 | EXCELLENT | EXCELLENT | BAD |

INDUSTRIAL UTILITY

Because an oriented polyester film in accordance with the present invention permits achievement of excellent adhesive force with respect to various members without producing poor external appearance due to occurrence of defects and/or degradation of resin during formation into modified polyester film, and is also provided with a low coefficient of friction permitting achievement of moldability for molding into such items as exterior parts of cars, it may be favorably used, for example, as a decorative film that may be affixed to surface(s) of exterior and/or interior parts of cars.

The invention claimed is:

1. An oriented polyester film containing antioxidant and modified polyolefin wax in a surface layer on at least one side thereof, wherein the oriented polyester film is such that the modified polyolefin wax contained in said layer is present in an amount that, as measured based on weight of a composition at said layer, is not less than 0.1 wt % but less than 3.0 wt %, and wherein the modified polyolefin wax is such that acid value thereof is not less than 1 mg KOH/g but less than 50 mg KOH/g, 3 wt % weight loss onset temperature thereof is not less than 300° C., weight-average molecular weight thereof is within a range that is 3,500 to 65,000, and the antioxidant is present in an amount that, as measured based on the weight of the composition, is not less than 0.02 wt % but less than 0.35 wt %.

2. The oriented polyester film according to claim 1 wherein the modified polyolefin wax contains at least one species selected from among the group consisting of acid-modified polypropylene wax, acid-modified polyethylene wax, polypropylene oxidate wax, and polyethylene oxidate wax.

3. The oriented polyester film according to claim 1 wherein the modified polyolefin wax is laminarly dispersed within said layer.

4. The oriented polyester film according to claim 1 wherein the modified polyolefin wax possesses at least one species selected from among the group consisting of carboxyl group, ketone group, and hydroxyl group.

5. The oriented polyester film according to claim 1 wherein the modified polyolefin wax contains acid-modified polypropylene wax.

6. The oriented polyester film according to claim 1 wherein the modified polyolefin wax contains acid-modified polyethylene wax.

7. The oriented polyester film according to claim 1 wherein the modified polyolefin wax contains polypropylene oxidate wax.

8. The oriented polyester film according to claim 1 wherein the modified polyolefin wax contains polyethylene oxidate wax.

9. The oriented polyester film according to claim 1 wherein thickness of the oriented polyester film is within a range that is 10 pin to 200 μm.

10. The oriented polyester film according to claim 1 wherein thickness of the oriented polyester film is within a range that is 15 μm to 100 μm.

11. The oriented polyester film according to claim 1 wherein polyester is present therein in an amount that is not less than 80 wt % per 100 wt % of the oriented polyester film.

12. The oriented polyester film according to claim 11 wherein the polyester is polyethylene terephthalate.

13. The oriented polyester film according to claim 1 having a multilayer structure that includes said layer.

14. The oriented polyester film according to claim 13 wherein the multilayer structure further possesses a layer that contains colorant pigment.

15. The oriented polyester film according to claim 13 wherein the multilayer structure farther possesses a core layer that is laminated to said layer and the core layer contains colorant pigment.

16. The oriented polyester film according to claim 1 wherein said layer contains colorant pigment.

17. The oriented polyester film according to claim 1 having a single-layer structure that includes said layer.

18. The oriented polyester film according to claim 17 wherein said layer contains colorant pigment.

19. A decorative laminated body having the oriented polyester film according to claim 1, and having at least one functional layer selected from among the group consisting of printing layer, hard coat layer, adhesion layer, and mold release layer provided on at least one face thereof.

* * * * *

UNITED STATES PATENT AND TRADEMARK OFFICE
CERTIFICATE OF CORRECTION

PATENT NO. : 11,028,243 B2  
APPLICATION NO. : 16/799546  
DATED : June 8, 2021  
INVENTOR(S) : Iyo et al.

Page 1 of 1

It is certified that error appears in the above-identified patent and that said Letters Patent is hereby corrected as shown below:

In the Claims

Column 28, Line 3, in Claim 9, "10 pin" should read "10 μm"

Column 28, Line 19, in Claim 15, "farther" should read "further"

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*